United States Patent
Sakai

(10) Patent No.: US 10,685,104 B2
(45) Date of Patent: Jun. 16, 2020

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 15/548,729

(22) PCT Filed: Jan. 15, 2016

(86) PCT No.: PCT/JP2016/000202
§ 371 (c)(1),
(2) Date: Aug. 3, 2017

(87) PCT Pub. No.: WO2016/129210
PCT Pub. Date: Aug. 18, 2016

(65) Prior Publication Data
US 2018/0004929 A1    Jan. 4, 2018

(30) Foreign Application Priority Data

Feb. 9, 2015   (JP) ................. 2015-023716

(51) Int. Cl.
*G06F 21/36* (2013.01)
*H04W 12/06* (2009.01)
*H04W 12/00* (2009.01)
*H04W 84/12* (2009.01)

(52) U.S. Cl.
CPC .......... *G06F 21/36* (2013.01); *H04W 12/003* (2019.01); *H04W 12/06* (2013.01); *H04W 12/00522* (2019.01); *H04W 84/12* (2013.01)

(58) Field of Classification Search
CPC ........ G06F 21/36; G06F 21/35; H04W 12/06; H04W 84/12; H04W 12/003; H04W 12/00522; H04L 63/0853
See application file for complete search history.

(56) References Cited

U.S. PATENT DOCUMENTS 8,887,262 B1    11/2014   Turner et al.
2013/0016710 A1*  1/2013  Shinohara ........... H04M 1/7253
                                                                    370/338
(Continued)

FOREIGN PATENT DOCUMENTS

JP    2006-261938 A    9/2006
JP    4312642 B2        8/2009
(Continued)

OTHER PUBLICATIONS

Anthony Brown, et al., MultiNet: Reducing Interaction Overhead in Domestic Wireless Networks, ACM SIGCHI Conference on Human Factors in Computing Systems, CHI 2013:Changing Perspectives, Apr. 27, 2013, pp. 1569-1578, CHI, Paris, France.

*Primary Examiner* — Amir Mehrmanesh
(74) *Attorney, Agent, or Firm* — Canon U.S.A. Inc., IP Division

(57) ABSTRACT

A communication apparatus includes a first execution unit, a second execution unit, and a selecting unit. The first execution unit performs a first process for setting a wireless parameter, based on information obtained from a captured image. The setting of a wireless parameter is performed between the communication apparatus and another communication apparatus that operates as an access point and that is different from the communication apparatus. The second execution unit performs, based on information obtained from a captured image, a second process for setting a wireless parameter to another communication apparatus that operates as a station and that is different from the commu- (Continued)

nication apparatus. The wireless parameter is one for performing wireless communication with an access point. The selecting unit selects whether the first process or the second process is to be performed, in a case where information is obtained from a first captured image.

10 Claims, 8 Drawing Sheets

(56) References Cited

U.S. PATENT DOCUMENTS

| | | | |
|---|---|---|---|
| 2013/0176956 A1* | 7/2013 | Yamamoto | H04W 76/11 370/329 |
| 2014/0056171 A1* | 2/2014 | Clegg | H04W 12/06 370/254 |
| 2016/0037564 A1* | 2/2016 | Borden | H04W 76/10 370/254 |
| 2016/0269394 A1* | 9/2016 | Zhong | H04W 48/14 |

FOREIGN PATENT DOCUMENTS

| | | |
|---|---|---|
| JP | 4416550 B2 | 2/2010 |
| JP | 2010178054 A | 8/2010 |
| JP | 2013143616 A | 7/2013 |
| JP | 2014-060623 A | 4/2014 |
| JP | 2014-230152 A | 12/2014 |
| JP | 2015-515048 A | 5/2015 |
| WO | 2011/132761 A1 | 10/2011 |
| WO | 2014/163877 A1 | 10/2014 |

* cited by examiner

[Fig. 1]
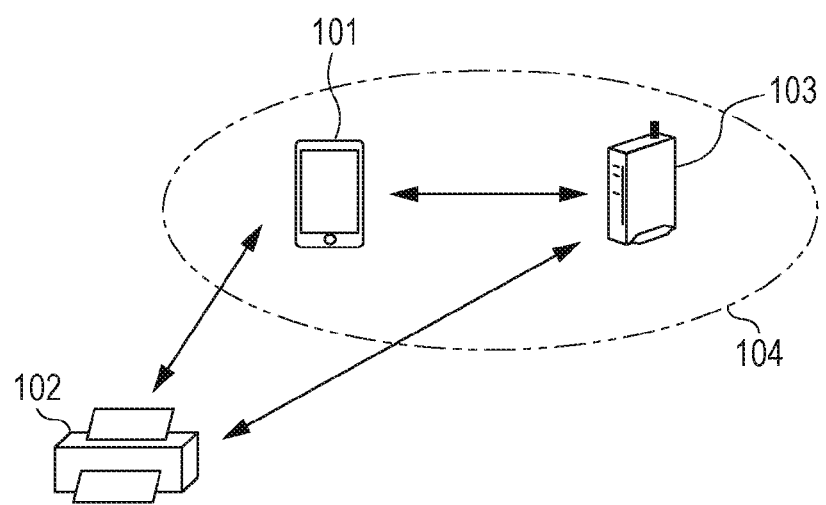

[Fig. 2]
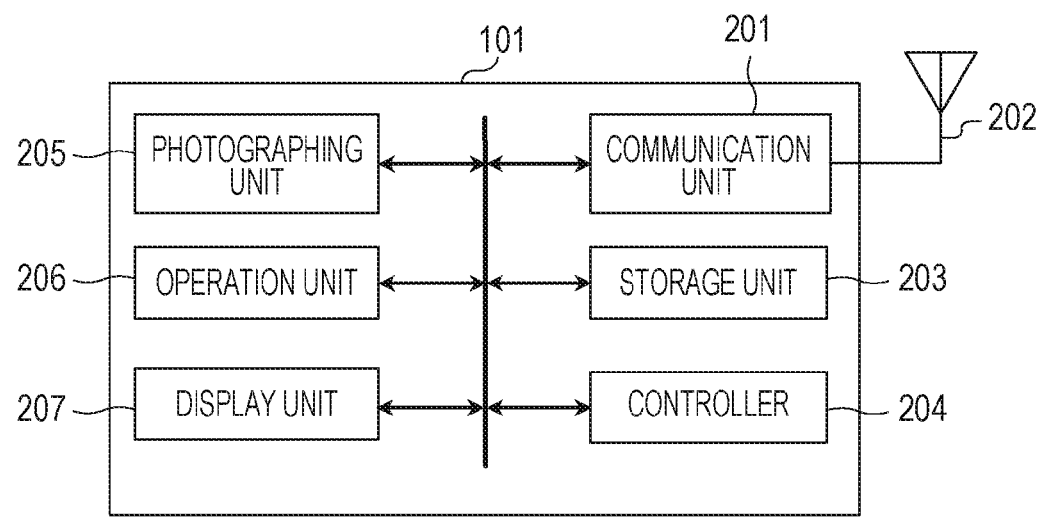
[Fig. 3]
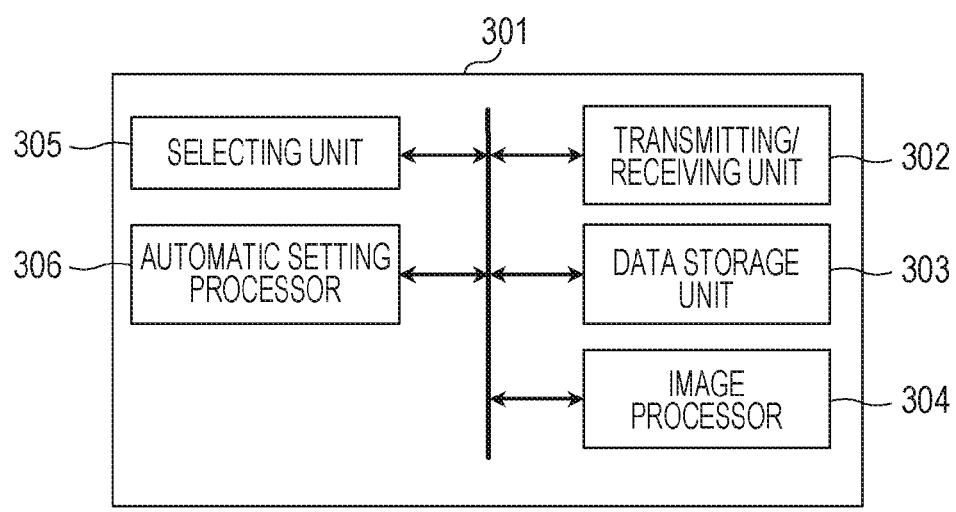

[Fig. 4]
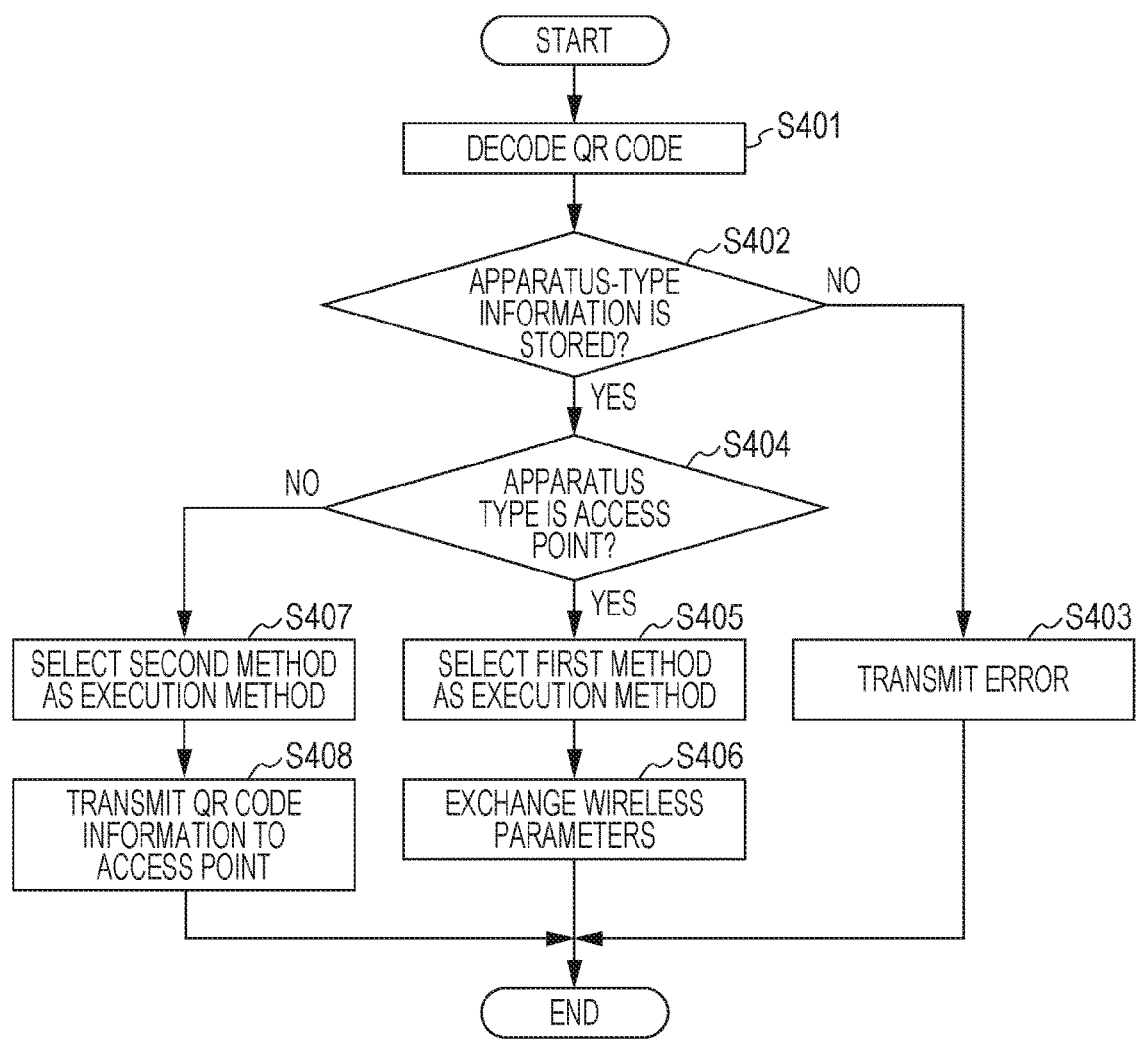

[Fig. 5]
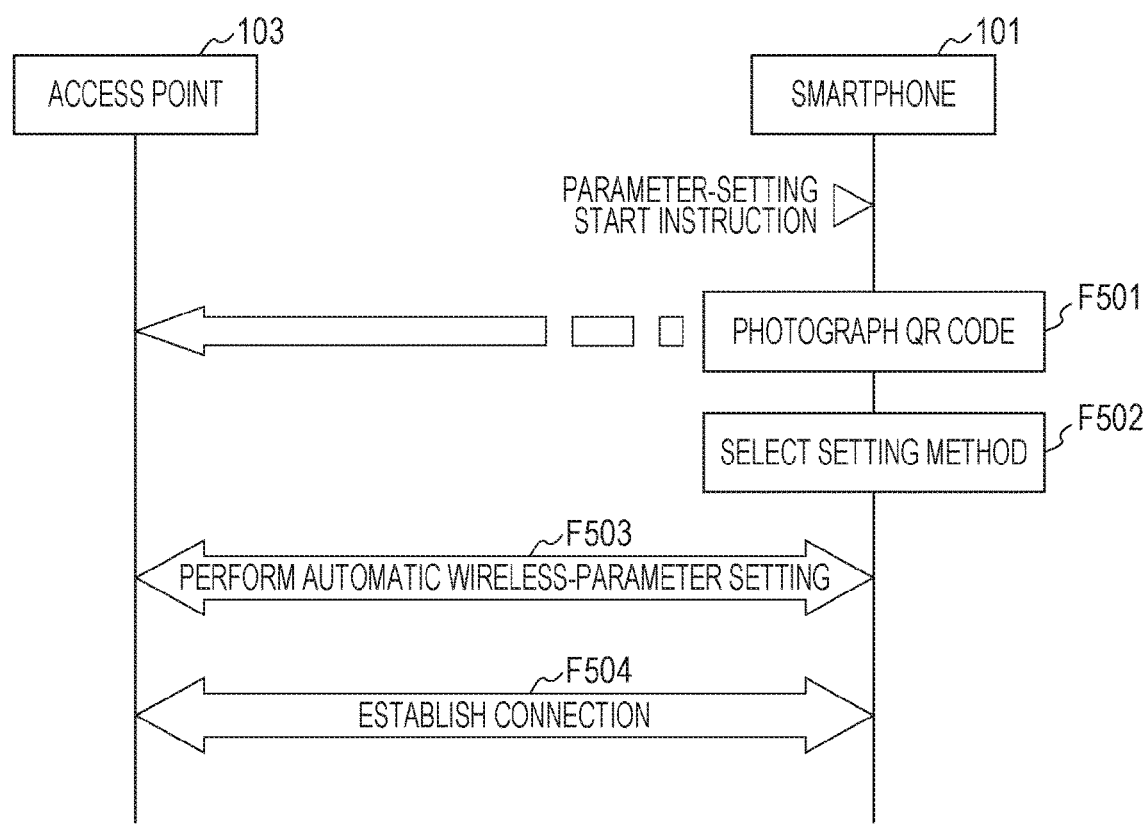

[Fig. 6]
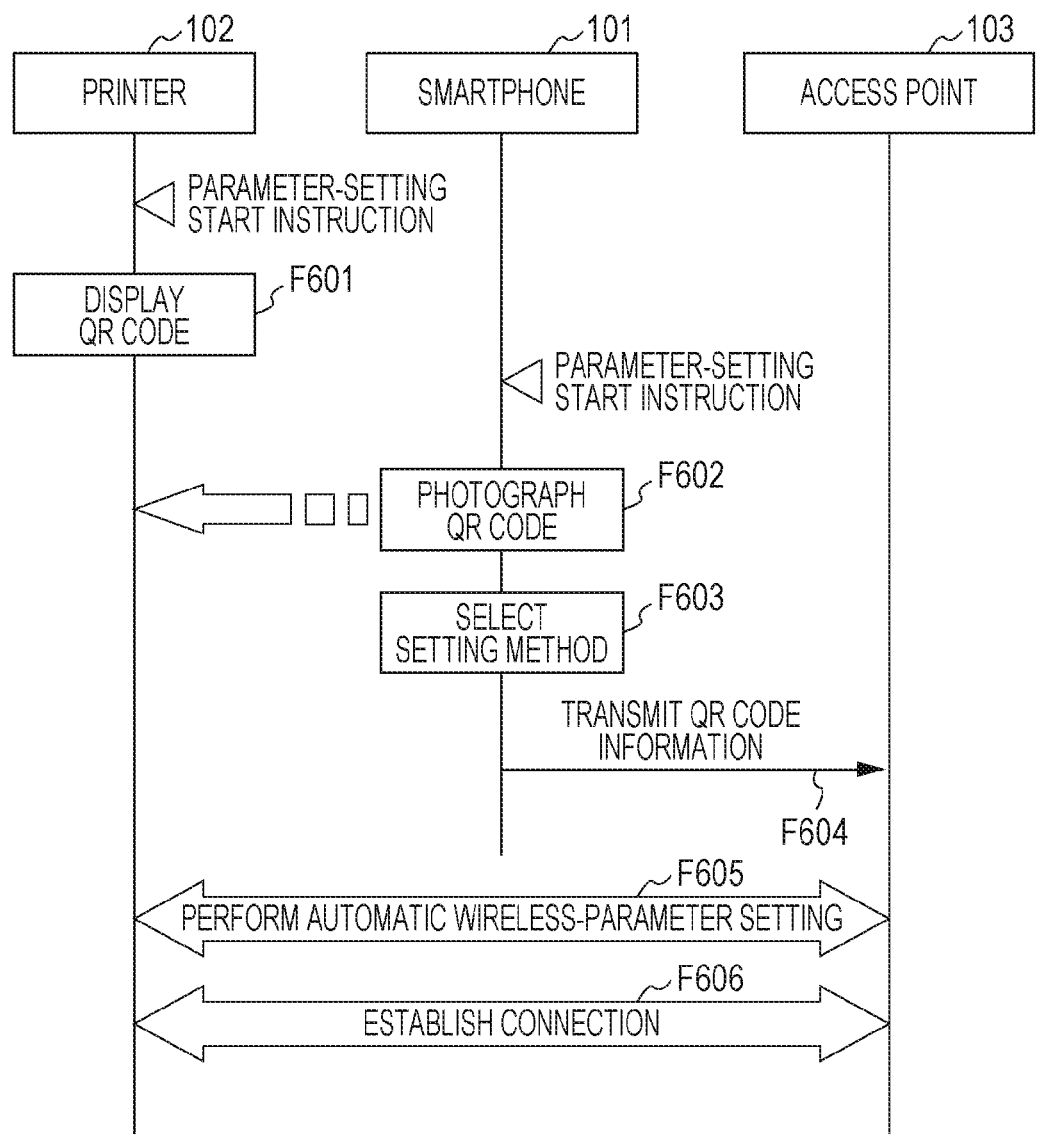

[Fig. 7]
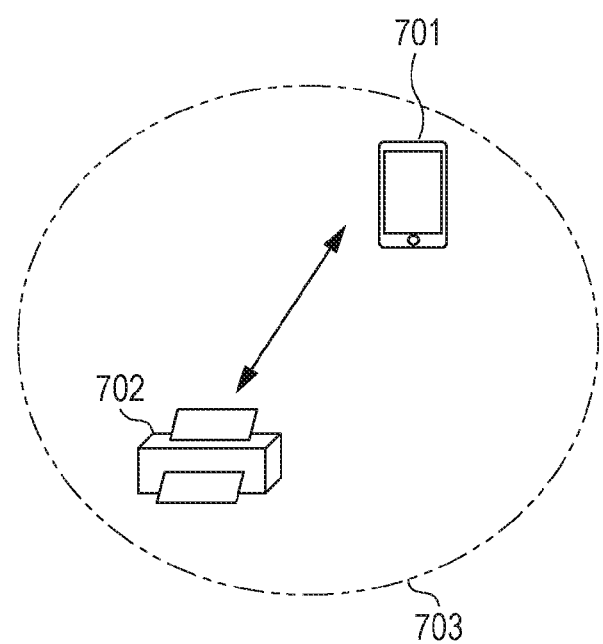

[Fig. 8]
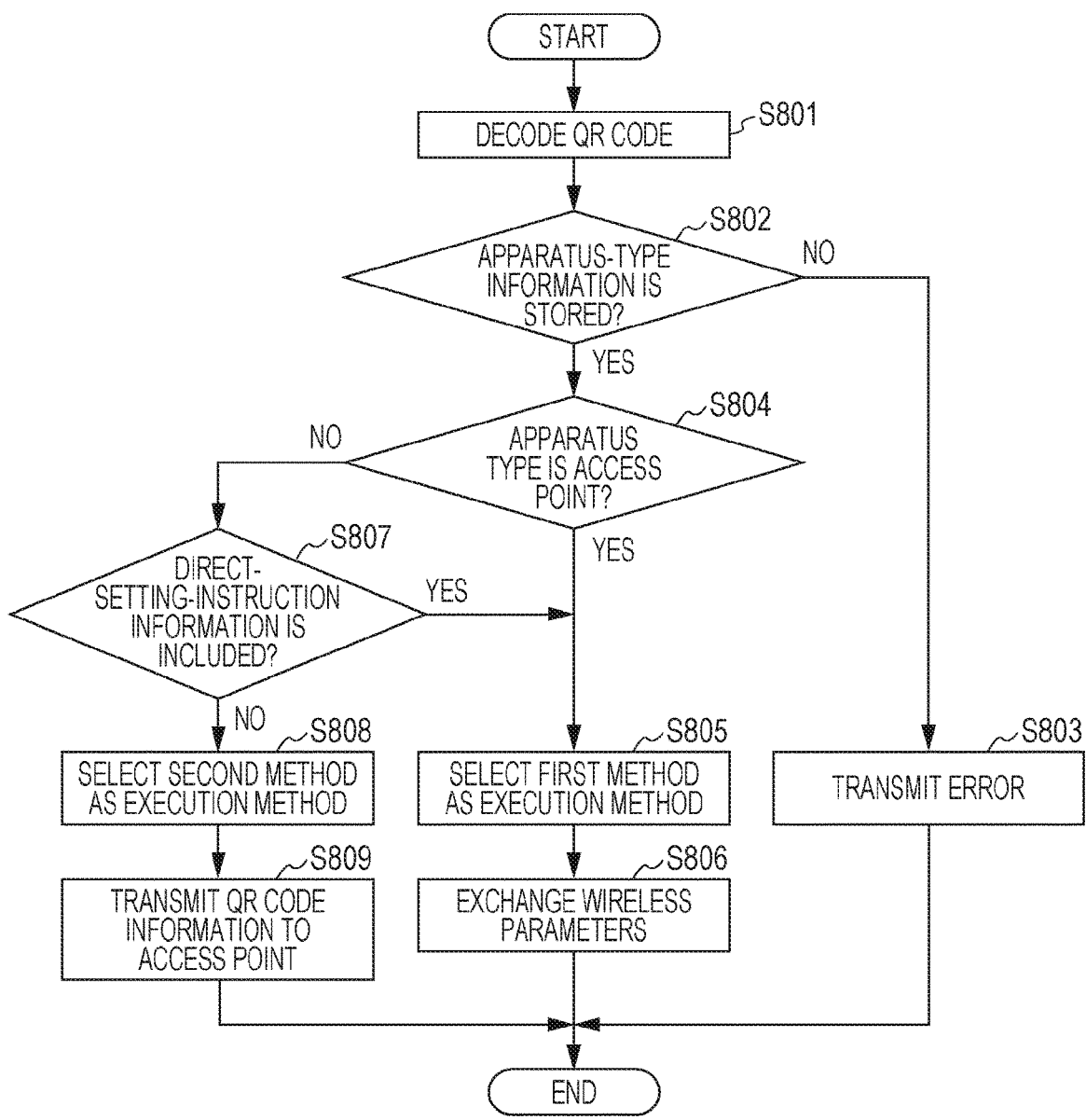

[Fig. 9]
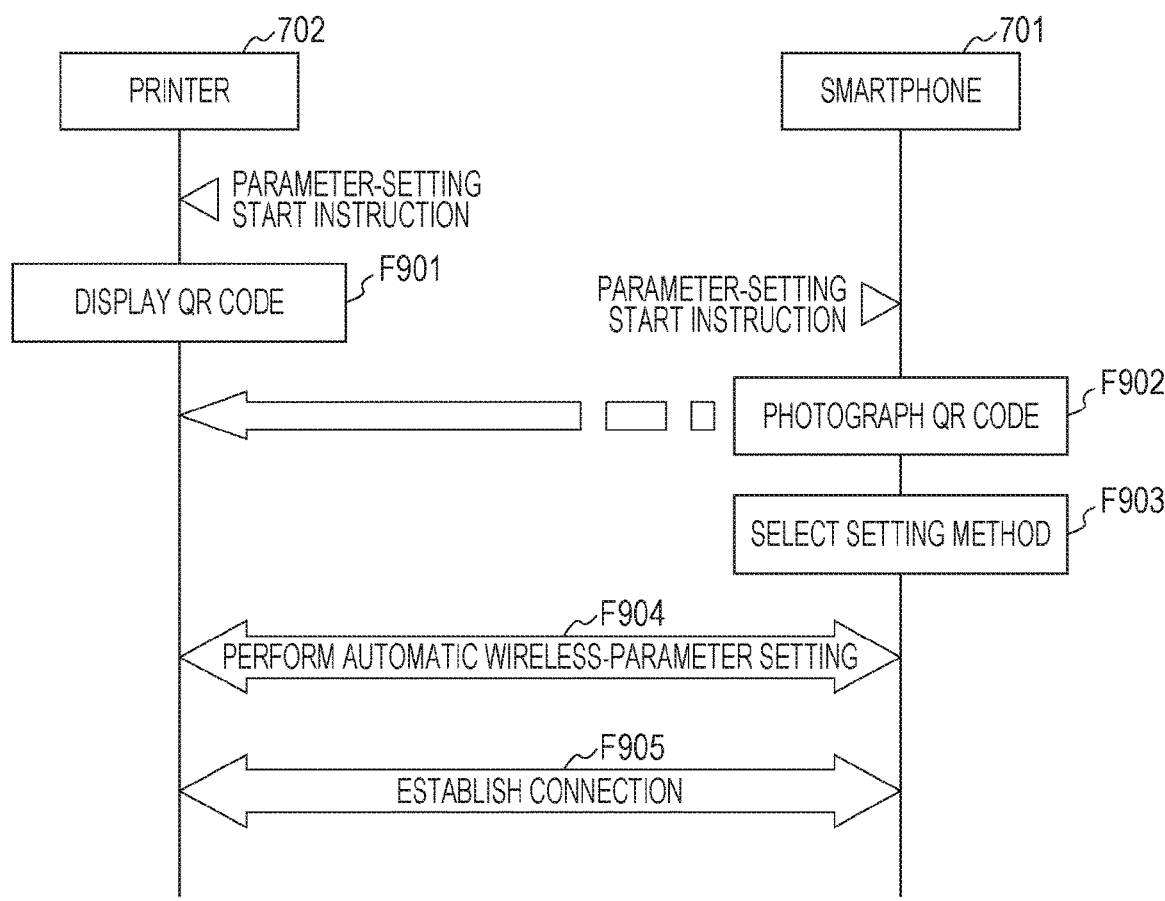

COMMUNICATION APPARATUS, CONTROL METHOD FOR COMMUNICATION APPARATUS, AND STORAGE MEDIUM

TECHNICAL FIELD

The present invention relates to communication technique.

BACKGROUND ART

Recently, it has been increasingly observed that electronic equipment, such as a digital camera, a printer, a cellular phone, or a smartphone, is provided with a wireless communication function and that such equipment is connected to a wireless network and used.

To connect electronic equipment to a wireless network, it is necessary to set various wireless parameters, such as an encryption method, an encryption key, an authentication method, and an authentication key. As a technique for facilitating setting of these wireless parameters, a technique disclosed in PTL 1 is known. In the technique disclosed in PTL 1, communication parameters generated by an access point are encoded into a two-dimensional code, and an access point displays the two-dimensional code on a screen. A terminal photographs the two-dimensional code displayed on the access point, and decodes the two-dimensional code, thereby setting the communication parameters. In PTL 2, a technique is proposed in which a terminal reads a quick response (QR) code (trademark, which will not be described hereinafter) that indicates communication parameters and that is displayed by electronic equipment, and in which an access point sets the communication parameters which have been read.

As described above, wireless parameters are set after photographing of code information such as a two-dimensional code in which many pieces of information are encoded, alleviating complexity of input operations performed by a user. However, as in the method for setting communication parameter between two apparatuses, which is disclosed in PTL 1, and as in the method for setting wireless parameters via three apparatuses, which is disclosed in PTL 2, no consideration is given to a case in which multiple setting methods may be performed after photographing of code information, in known techniques. Therefore, in known techniques, it is impossible to select an adequate method from multiple setting methods and perform the selected method when wireless parameters are to be set after photographing of code information.

CITATION LIST

Patent Literature

PTL 1: Japanese Patent Laid-Open No. 2006-261938
PTL 2: Japanese Patent Laid-Open No. 2014-60623
PTL 3: Japanese Patent Laid-Open No. 2014-230152

SUMMARY OF INVENTION

Solution to Problem

The present invention provides a communication apparatus including a first execution unit, a second execution unit, and a selecting unit. The first execution unit performs a first process on the basis of information obtained from a captured image. The first process is a process for setting a wireless parameter for performing wireless communication. The setting of a wireless parameter is performed between the communication apparatus and an other communication apparatus that operates as an access point and that is different from the communication apparatus. The second execution unit performs a second process on the basis of information obtained from a captured image. The second process is a process for setting a wireless parameter to an other communication apparatus that operates as a station and that is different from the communication apparatus. The wireless parameter is a parameter for performing wireless communication with an access point. The selecting unit selects whether the first process or the second process is to be performed, in a case where information is obtained from a first captured image.

Further features of the present invention will become apparent from the following description of exemplary embodiments with reference to the attached drawings.

BRIEF DESCRIPTION OF DRAWINGS

FIG. 1 is a diagram illustrating an exemplary configuration of a communication system.
FIG. 2 is a diagram illustrating the configuration of a smartphone.
FIG. 3 is a diagram illustrating the functional configuration of the smartphone.
FIG. 4 is a flowchart of an operation performed by the smartphone.
FIG. 5 is a diagram illustrating an operation sequence in the communication system.
FIG. 6 is a diagram illustrating an operation sequence in the communication system.
FIG. 7 is a diagram illustrating an exemplary configuration of a communication system according to a second embodiment.
FIG. 8 is a flowchart of an operation performed by a smartphone.
FIG. 9 is a diagram illustrating an operation sequence in the communication system according to the second embodiment.

DESCRIPTION OF EMBODIMENTS

Embodiments described below provide a technique of selecting any one of multiple processes when wireless parameters are to be shared after shooting.

First Embodiment

FIG. 1 illustrates the configuration of a communication system according to a first embodiment. In FIG. 1, the communication system includes a smartphone 101, a printer 102, an access point 103, and a wireless network 104 constructed by the access point 103. In the first embodiment, the wireless network 104 illustrated in FIG. 1 is a wireless local-area network (LAN) in conformity with the IEEE (The Institute of Electrical and Electronics Engineers, Inc.) 802.11 series. However, the communication form is not necessarily limited to a wireless LAN in conformity with IEEE 802.11.

In the first embodiment, the access point 103 (hereinafter referred to as the AP 103) operates as an access point in the infrastructure mode defined in the IEEE 802.11 standard. The AP 103 constructs a wireless network, and performs authentication and encryption processes on a station (STA), management of a STA, and the like. The smartphone 101 and the printer 102 operate as a station (STA) in the infrastructure mode defined in the IEEE 802.11 standard.

In the description below, a case in which the smartphone 101 and the printer 102 are connected to the wireless network 104 constructed by the AP 103 and in which the smartphone 101 and the printer 102 communicate with each other via the AP 103 will be described. Description will be made by using a smartphone and a printer as apparatuses in the communication system according to the first embodiment. However, the apparatuses in the communication system according to the first embodiment may be, for example, other apparatuses, such as a digital camera, a personal computer (PC), a video camera, a smartwatch, and a personal digital assistant (PDA).

The hardware configuration of an apparatus in the first embodiment will be described by using FIG. 2. Description will be made by taking the configuration of the smartphone 101 as an example. The printer 102 and the AP 103 have a similar configuration, and those of the printer 102 and the AP 103 will not be described.

FIG. 2 is a diagram illustrating an exemplary configuration of the smartphone 101. A communication unit 201 performs wireless LAN communication in conformity of the IEEE 802.11 series. The communication unit 201 is formed of a chip performing wireless communication. An antenna 202 is capable of performing communication in the 2.4-GHz band and/or the 5-GHz band for performing wireless LAN communication. A storage unit 203 stores various types of information, such as control programs performed by a controller 204 and information about a communication partner apparatus. The storage unit 203 is, for example, constituted by storage media, such as a hard disk drive (HDD), a flash memory, a removable Secure Digital (SD) card, a read-only memory (ROM), and a random-access memory (RAM).

The controller 204 executes the control programs stored in the storage unit 203, thereby controlling the entire smartphone 101. The controller 204 executes the control programs stored in the storage unit 203, whereby various operations described below are performed. The controller 204 is, for example, constituted by a central processing unit (CPU).

A photographing unit 205 is constituted by image sensors, a lens, and the like. The photographing unit 205 takes a photograph and a movie. The photographing unit 205, for example, photographs and reads code information, such as a bar code, a two-dimensional code, and a quick response (QR) code. An operation unit 206 receives various inputs and the like from a user. The operation unit 206 receives inputs for operating the smartphone 101. The operation unit 206 includes operation buttons and a touch user interface (UI). The operation unit 206 stores a flag corresponding to an input in a memory such as the storage unit 203. A display unit 207 is provided with a function of outputting at least one of visual information and sound information. In the case where the display unit 207 displays visual information, the display unit 207 has a video RAM (VRAM) storing image data corresponding to visual information to be displayed. The display unit 207 controls display so that image data stored in the VRAM continues to be displayed on a liquid crystal display (LCD) or a light-emitting diode (LED) display.

FIG. 3 is a diagram illustrating an exemplary configuration of software functional blocks of the smartphone 101 which perform communication controlling functions described below. In the first embodiment, the functional blocks of the smartphone 101 of the smartphone 101 are stored in the storage unit 203 as programs, and the programs are executed by the controller 204, whereby the functions of the functional blocks are performed. The controller 204 controls pieces of hardware, and calculates and processes information in accordance with the control programs, thereby achieving the functions. Some or all of the functional blocks may be implemented as hardware. In this case, some or all of the functional blocks are, for example, constituted by an application specific integrated circuit (ASIC).

FIG. 3 illustrates an entire software functional block 301. A transmitting/receiving unit 302 controls the communication unit 201 in order to receive/transmit various wireless LAN packets for performing wireless LAN communication in conformity of the IEEE 802.11 standard with a target apparatus. A data storage unit 303 controls storing of software itself and setting information, such as wireless parameters and public key information which is used in automatic wireless-parameter setting, in the storage unit 203, and also controls reading of such data from the storage unit 203.

An image processor 304 performs image processing, for example, on an image captured by using the photographing unit 205. The image processor 304 performs a process, which is described below, of decoding and analyzing code information such as a QR code. The image processor 304 analyzes an image captured by the photographing unit 205, and decodes coded information to obtain decoded information. A selecting unit 305 selects a method to be performed, from multiple automatic wireless-parameter setting methods which may be performed by the smartphone 101. The selecting unit 305 performs an automatic wireless-parameter-setting selecting process described below.

An automatic setting processor 306 performs the automatic wireless-parameter setting process of sharing wireless parameters between apparatuses. In the automatic wireless-parameter setting process, a parameter-providing apparatus supplies communication parameters for wireless communication to a parameter-receiving apparatus. The wireless parameters include wireless communication parameters necessary to perform wireless LAN communication, such as a service set identifier (SSID) serving as a network identifier, an encryption method, an encryption key, an authentication method, and an authentication key. The wireless parameters may include a media access control (MAC) address, a passphrase, an IP address for performing communication in the IP layer, and information necessary for an upper service.

The automatic setting processor 306 is capable of performing multiple types of automatic wireless-parameter setting processes. A first method which may be performed by the automatic setting processor 306 is a method for sharing wireless parameters between two apparatuses, the smartphone 101 and an apparatus.

In the first method, the smartphone 101 photographs a QR code which is displayed on the apparatus or which is associated with the apparatus. The smartphone 101 obtains information which is necessary to perform setting of wireless parameters and which is included the QR code which has been read. Examples of the information necessary to perform setting of wireless parameters include the wireless parameters themselves, identification information of the apparatus, and identification information of the automatic wireless-parameter setting process.

The smartphone 101 obtains identification information of the apparatus which is included in the QR code which has been read. The identification information of the apparatus may be a MAC address or a universally unique identifier (UUID) which is used to identify a device uniquely. The smartphone 101 receives wireless parameters from the apparatus indicated by the identification information obtained from the QR code. The smartphone 101 establishes a wireless connection with the apparatus indicated by the identification information obtained from the QR code, on the basis of the received wireless parameters. In the automatic wireless-parameter setting process, wireless parameters encrypted by using a public key or a certificate may be transmitted from the apparatus. The public key may be included in the QR code. As a method for encrypting wireless parameters by using a public key, for example, a method disclosed in PTL 3 may be used.

A second method which may be performed by the automatic setting processor 306 is a method for sharing wireless parameters among other apparatuses via the smartphone 101.

In the second method, the smartphone 101 performs a process for establishing a wireless connection between a first apparatus and a second apparatus. The first apparatus is an apparatus which newly participates in a wireless network. The first apparatus operates as a parameter-receiving apparatus receiving wireless parameters in the automatic wireless-parameter setting process. The second apparatus is capable of operating as a parameter-providing apparatus providing wireless parameters in the automatic wireless-parameter setting process. The second apparatus may be an access point constructing a wireless network.

In the second method, the smartphone 101 photographs a QR code which is displayed on the first apparatus or which is associated with the first apparatus. The QR code associated with the first apparatus is, for example, a QR code attached on the case of the first apparatus or a QR code described in an instruction manual of the first apparatus.

The smartphone 101 obtains identification information of the first apparatus which is included in the read QR code. The smartphone 101 transfers the identification information of the first apparatus which is included in the read QR code, via a secure link to the second apparatus which becomes connectable by performing the first method in advance and which is capable of establishing the secure link. The second apparatus to which the identification information of the first apparatus which is included in the QR code is transferred from the smartphone 101 transmits wireless parameters to the first apparatus. The first apparatus establishes a wireless connection with the second apparatus on the basis of the received wireless parameters. The second apparatus may transmit wireless parameters encrypted by using a public-key encryption method, to the first apparatus. Thus, the smartphone 101 enables multiple types of automatic wireless-parameter setting processes to be performed after photographing of code information. In the description below, an example in which, when the smartphone 101 photographs code information, the smartphone 101 selects a method that is to be performed, from multiple methods will be described.

An operation performed by the smartphone 101 according to the first embodiment will be described by using the flowchart illustrated in FIG. 4. FIG. 4 is a flowchart used when the smartphone 101 is to perform an automatic wireless-parameter setting process. After a user transmits an instruction to start automatic wireless-parameter setting via the operation unit 206, when the photographing unit 205 photographs a QR code, the process for the flowchart in FIG. 4 starts. The process in FIG. 4 is performed by the controller 204 reading and executing computer programs stored in the storage unit 203. Some or all of the steps in the flowchart in FIG. 4 may be achieved, for example, by using hardware such as an ASIC.

When the smartphone 101 uses the photographing unit 205 to photograph a QR code, the smartphone 101 decodes the photographed QR code, and stores the information in the storage unit 203 (S401).

The smartphone 101 starts the automatic wireless-parameter-setting selecting process by using the selecting unit 305 on the basis of the information obtained from the QR code. First, the smartphone 101 reads decoded data of the QR code, and checks whether or not apparatus-type information is stored in the decoded data (S402). The apparatus-type information is information for identifying the apparatus type. In the first embodiment, the QR code includes information indicating whether the apparatus type is the access point or the station.

If the result of the determination in S402 indicates that apparatus-type information is not stored in the decoded data (NO in S402), the smartphone 101 displays an error on the display unit 207 and ends the process (S403). If apparatus-identification information is not included in the QR code, the smartphone 101 causes the process to end in failure in S403. The apparatus-identification information may be a MAC address or a UUID for identifying an apparatus uniquely. If public key information is not included in the QR code, the smartphone 101 causes the process to end in failure in S403.

If the result of the determination in S402 indicates that apparatus-type information is stored in the decoded data (YES in S402), the smartphone 101 checks whether or not the apparatus-type information indicates the access point (S404). If the result of the determination in S404 indicates that the apparatus-type information indicates the access point (YES in S404), the smartphone 101 selects the first method as automatic wireless-parameter setting to be performed (S405). The smartphone 101 uses the automatic setting processor 306 to perform automatic wireless-parameter setting according to the first method, shares wireless parameters between the smartphone 101 and the apparatus identified with the identifier in the QR code, and ends the process (S406).

A specific process in S405 will be described. In the description, a case in which the identifier of the AP 103 is included in the QR code will be described.

The smartphone 101 transmits a search signal in which the identifier of the AP 103 identified with the identifier in the QR code is specified, through the communication unit 201. The search signal may be a probe request defined in IEEE 802.11. In the search signal, identification information of the automatic wireless-parameter setting according to the first method, or information indicating that automatic wireless-parameter setting has been activated by using the first method may be added.

When the smartphone 101 receives a response signal to the search signal from the AP 103 through the communication unit 201, the smartphone 101 detects the source apparatus from which the response signal has been transmitted, as a setting-target apparatus for the automatic wireless-parameter setting process. The response signal may be a probe response defined in IEEE 802.11. In the response signal, identification information of the automatic wireless-parameter setting according to the first method, or information indicating that automatic wireless-parameter setting has been activated by using the first method may be added.

The AP 103 transmits wireless parameters for establishing a connection with the AP 103, to the smartphone 101. In the transmission of wireless parameters, wireless parameters encrypted, for example, by using a public key described in PTL 3 may be transmitted.

The smartphone 101 establishes a connection with the wireless network 104 constructed by the AP 103, by using the wireless parameters obtained from the AP 103. The smartphone 101 performs data communication via the AP 103. In the data communication, the smartphone 101 may perform communication via the Internet to which the AP 103 is connected, or may perform an image transfer service in which a photographed image is transmitted via the AP 103 to another apparatus connected to the wireless network 104.

Returning back to FIG. 4, in S404, if it is determined that the apparatus-type information indicates an apparatus type other than the access point (NO in S404), the smartphone 101 selects the second method as automatic wireless-parameter setting to be performed (S407).

The smartphone 101 uses the automatic setting processor 306 to perform automatic wireless-parameter setting according to the second method, transmits the identifier included in the photographed QR code to an access point through the communication unit 201, and ends the process (S408).

In S408, when the transmission to the access point fails, or when a connection between the smartphone 101 and the access point has not been established, the smartphone 101 may cause the process to end in failure.

The specific process in S407 will be described. In the description, a case in which the identifier of the printer 102 is included in the QR code and in which the smartphone 101 is capable of establishing a secure link with the AP 103 will be described.

To participate in the wireless network 104 constructed by the AP 103, the printer 102 displays a QR code in which information for performing setting of wireless parameters with the AP 103 is embedded, on a display unit of the printer 102 in accordance with a user operation. For example, the information for setting wireless parameters includes identification information of the printer 102, and apparatus-type information indicating the station.

The smartphone 101 reads the QR code displayed on the printer 102 by using the photographing unit 205 of the smartphone 101. Since the apparatus-type information obtained from the read QR code indicates the station, the smartphone 101 selects the second method. If the smartphone 101 determines that apparatus-identification information is included, the smartphone 101 transfers the information which is read from the QR code, to the AP 103 through the communication unit 201. That is, the smartphone 101 transmits the identification information of the printer 102 which is read from the QR code, and a request for wireless parameters to the AP 103.

The transfer is performed by using the wireless network 104 which is a secure link established between the AP 103 and the smartphone 101. Alternatively, the transfer may be performed by using a secure link different from the wireless network 104. For example, the transfer may be performed through secure proximity wireless communication such as near field communication (NFC). The transfer may be performed by using communication other than wireless LAN communication, such as Bluetooth (trademark). The smartphone 101 may perform the transfer by displaying the identification information of the printer 102 which is read from the obtained QR code, and a request for wireless parameters, as a QR code on the display unit 207 of the smartphone 101, and causing the AP 103 to read the QR code.

When the AP 103 receives the identification information of the printer 102 and the request for wireless parameters from the smartphone 101, the AP 103 transmits a search signal for searching for the parameter-receiving apparatus (printer 102) indicated by the identification information. The search signal may be a probe request defined in IEEE 802.11. The search signal may be a probe request in which an apparatus corresponding to the identification information is specified.

When the printer 102 receives the search signal from the AP 103, the printer 102 returns a response signal. The transmission of signals between the AP 103 and the printer 102 enables the AP 103 and the printer 102 to detect each other as a communication partner for the automatic wireless-parameter setting process.

The configuration in which the AP 103 transmits a search signal to search for the printer 102 which is a parameter-receiving apparatus is employed. Alternatively, the printer 102 may transmit a search signal to search for the AP 103 which is a parameter-providing apparatus. In this case, as soon as the printer 102 displays the QR code, the printer 102 starts transmission of the search signal. After the AP 103 receives the apparatus identification information and a request for wireless parameters from the smartphone 101, the AP 103 waits for a search signal from the apparatus (printer 102) indicated by the received identification information. When the AP 103 receives a search signal from the apparatus (printer 102) indicated by the received identification information, the AP 103 transmits a response signal in which identification information of the automatic wireless-parameter setting according to the second method or information indicating that automatic wireless-parameter setting has been activated by using the second method is added. When the printer 102 receives the response signal in which identification information of the automatic wireless-parameter setting according to the second method or information indicating that automatic wireless-parameter setting has been activated by using the second method is added, the printer 102 recognizes the source apparatus from which the response signal has been transmitted, as a partner apparatus for the wireless parameter sharing process. When the printer 102 receives the response signal in which identification information of the automatic wireless-parameter setting according to the second method or information indicating that automatic wireless-parameter setting has been activated by using the second method is not added, the printer 102 ignores the response signal. The printer 102 may perform no automatic wireless-parameter setting processes with the source apparatus from which the response signal has been transmitted.

Subsequently, the printer 102 and the AP 103 which detect each other perform automatic wireless-parameter setting. The AP 103 transmits wireless parameters for establishing a connection with the wireless network 104 and performing communication, to the printer 102. In the transmission of wireless parameters, wireless parameters encrypted, for example, by using a public key as described in PTL 3 may be transmitted.

The printer 102 establishes a connection with the wireless network 104 constructed by the AP 103, by using the wireless parameters obtained from the AP 103, The printer 102 performs data communication via the AP 103. In the data communication, the printer 102 may perform communication via the Internet to which the AP 103 is connected, or may perform an image transfer service in which a photographed image is received via the AP 103 from the smartphone 101.

Thus, when the smartphone 101 is to set wireless parameters after photographing of code information, the smartphone 101 automatically selects a method to be performed, from multiple methods in accordance with the code information.

In the above-described description, the smartphone 101 selects the first method or the second method depending on whether or not apparatus-type information included in a QR code which has been read indicates the access point. However, for example, when the apparatus-type information included in the QR code which has been read indicates the terminal, such as a smartphone, a camera, or a printer, the smartphone 101 may select the second method. When the apparatus-type information included in the QR code which has been read does not indicate the terminal, such as a smartphone, camera, or a printer, the smartphone 101 may select the first method.

When the QR code which has been read includes information indicating a method which may be performed by the partner apparatus, the smartphone 101 may select a method to be performed, on the basis of the information. For example, when the QR code which has been read includes information indicating that the first method may be performed, the smartphone 101 may select the first method. When the QR code which has been read includes information that the second method may be performed, the smartphone 101 may select the second method.

The smartphone 101 may cause a user to select whether the first method or the second method is to be performed. The smartphone 101 may cause a user to perform setting about whether the first method or the second method is to be performed, before photographing of a QR code. Upon photographing of a QR code, the smartphone 101 may present a user with identification information of the apparatus which is included in the QR code which has been read, and may transmit an inquiry about whether the first method or the second method is to be performed, to the user by using the display unit 207. After the inquiry, the smartphone 101 performs the first method or the second method in accordance with the selection made by the user through the operation unit 206.

The smartphone 101 may select whether the first method or the second method is to be performed in accordance with an operation mode selected by a user. For example, when a first mode in which the first method is to be performed is set in accordance with an operation performed by a user through the operation unit 206, the smartphone 101 activates the photographing unit 205. When code information is photographed by using the photographing unit 205 in a state in which the user has set the first mode, the smartphone 101 performs a process according to the first method on the basis of the code information. When a second mode in which the second method is to be performed is set in accordance with an operation performed by the user through the operation unit 206, the smartphone 101 activates the photographing unit 205. When code information is photographed by using the photographing unit 205 in a state in which the user has set the second mode, the smartphone 101 performs a process according to the second method on the basis of the code information.

When a QR code of an apparatus whose type is not the access point is photographed in the state in which a user has selected the first method, an error, such as information indicating that the QR code is not one for the access point, may be displayed on the display unit 207. In this case, the smartphone 101 may end the process in failure. Alternatively, in this case, the smartphone 101 may display information for urging the user to photograph a QR code again, such as a message, "Photograph a QR code for an access point again.", on the display unit 207. Until an instruction indicating end of the process is transmitted from the user through the operation unit 206, the smartphone 101 may repeatedly photograph a QR code of an apparatus whose type is the access point.

Similarly, when a QR code of an apparatus whose type is not the station is photographed in the state in which a user has selected the second method, the smartphone 101 may end the process in failure. In this case, the smartphone 101 may display an error such as information indicating that the QR code is not one for a station on the display unit 207. In this case, the smartphone 101 may display information for urging the user to photograph a QR code again, such as a message, "Photograph a QR code for a station again." on the display unit 207. Until an instruction indicating end of the process is transmitted from the user through the operation unit 206, the smartphone 101 may repeatedly photograph a QR code of an apparatus whose type is the station.

The smartphone 101 may select the first method or the second method in accordance with the state of the smartphone 101 at the time of photographing the QR code which is read. For example, in the case where the smartphone 101 does not participate in a wireless network when the smartphone 101 photographs the QR code, the smartphone 101 may avoid performing (selecting) the first method. In the case where the smartphone 101 does not register an access point which is capable of establishing a secure link when the smartphone 101 photographs the QR code, the smartphone 101 may avoid performing (selecting) the first method.

A sequence chart for the communication system will be described by using FIG. 5. The sequence chart in FIG. 5 describes operations performed when the smartphone 101 selects the first method on the basis of the information obtained when the smartphone 101 photographs a QR code.

When the smartphone 101 receives a parameter-setting start instruction through the operation unit 206, the smartphone 101 activates the photographing unit 205 to photograph a QR code attached to or displayed on the AP 103 (F501). In the QR code attached to or displayed on the AP 103, the identifier of the AP 103 and apparatus-type information indicating the access point are encoded.

After photographing of the QR code, the smartphone 101 performs the process described in FIG. 4. Since the apparatus-type information indicating the access point is detected, the smartphone 101 selects the first method as automatic wireless-parameter setting to be performed (F502). The smartphone 101 performs the process according to the first method which is described in S406, and receives wireless parameters from the AP 103 (F503). The smartphone 101 uses the received wireless parameters to establish a connection with the wireless network 104 through the communication unit 201 (F504). The smartphone 101 performs communication by using the received wireless parameters.

A sequence chart for the communication system will be described by using FIG. 6. The sequence chart in FIG. 6 describes operations performed when the smartphone 101 selects the second method on the basis of the information obtained when the smartphone 101 photographs a QR code.

After the printer 102 receives a parameter-setting start instruction, the printer 102 displays a QR code on the display unit (F601). In the displayed QR code, the identifier of the printer 102 and apparatus-type information indicating the printer or the station are encoded.

After the smartphone 101 receives the parameter-setting start instruction, the smartphone 101 activates the photographing unit 205 to photograph the QR code displayed on the printer 102 (F602).

After photographing of the QR code, the smartphone 101 performs the process described in FIG. 4. Since the apparatus-type information indicating the printer or the station is detected, the smartphone 101 selects the second method as automatic wireless-parameter setting to be performed (F603). The smartphone 101 performs the process according to the second method which is described in S407, and transmits the identifier included in the photographed QR code to the AP 103 (F604).

As described in S407, the AP 103 uses the received identifier to transmit wireless parameters to the printer 102 (F605). The printer 102 uses the received wireless parameters to establish a connection with the wireless network 104 (F606). In F606, when the printer 102 establishes a connection with the wireless network 104, the smartphone 101 and the printer 102 may perform print service and data transfer service over the wireless network 104 through the AP 103. The print service is a service in which the smartphone 101 transmits image data to the printer 102 and in which the printer 102 prints the received image data.

Thus, according to the first embodiment, an apparatus refers to apparatus-type information included in a QR code, thereby being capable of selecting an automatic wireless-parameter setting process to be performed. Thus, usability is improved. According to the first embodiment, the first method or the second method may be performed in accordance with a user operation.

In S406 in FIG. 4, the smartphone 101 may transmit wireless parameters generated by the smartphone 101 to a target apparatus, thereby changing parameters of a network constructed by the target apparatus.

After S407 or S405, before the process in S408 or S406 is performed, the smartphone 101 may transmit an inquiry about whether or not the automatic wireless-parameter setting process is to be performed, to the user by using the display unit 207. After the inquiry, when the user instructs the smartphone 101 to perform the automatic wireless-parameter setting process through the operation unit 206, the smartphone 101 may perform S408 or S406.

Second Embodiment

In the first embodiment, the configuration is described in which apparatus-type information included in a QR code is referred to and in which an automatic wireless-parameter setting process to be performed is thereby selected.

In a second embodiment, a configuration will be described in which information indicating an instruction to share communication parameters between apparatuses other than an access point is stored in a QR code and in which the apparatuses other than an access point thereby share wireless parameters directly.

FIG. 7 illustrates the configuration of a communication system according to the second embodiment. FIG. 7 illustrates a smartphone 701 and a printer 702. FIG. 7 also illustrates a wireless network 703 constructed by the printer 702. In the second embodiment, an example in which the wireless network 104 illustrates in FIG. 7 is a wireless LAN in conformity with the IEEE 802.11 series will be described. However, the communication form is not necessarily limited to a wireless LAN in conformity with IEEE 802.11. Description will be made by using the wireless network 703 as a network operating in the infrastructure mode defined in the IEEE 802.11 standard. However, the wireless network 703 may be a network in the ad hoc mode defined in the IEEE 802.11 standard. The wireless network 703 may be a network of Wi-Fi Direct (trademark) defined by the Wi-Fi alliance. The configurations of the apparatuses in the second embodiment are similar to those in the first embodiment.

In a QR code used in the second embodiment, in addition to the identifier of the apparatus and apparatus-type information, direct-setting-instruction information indicating an instruction to exchange communication parameters between apparatuses other than an access point is encoded. The direct-setting-instruction information may be regarded as information for requesting selectin of the first method.

An operation performed by the smartphone 701 according to the second embodiment will be described by using the flowchart illustrated in FIG. 8. FIG. 8 is a flowchart used when the smartphone 701 is to perform an automatic wireless-parameter setting process. After a user transmits an instruction to start automatic wireless-parameter setting via the operation unit 206, when the photographing unit 205 photographs a QR code, the process for the flowchart in FIG. 8 starts. The process in FIG. 8 is performed by the controller 204 reading and executing computer programs stored in the storage unit 203. Some or all of the steps in the flowchart in FIG. 8 may be achieved, for example, by using hardware such as an ASIC.

When the smartphone 701 uses the photographing unit 205 to photograph a QR code, the smartphone 701 decodes the photographed QR code, and stores the information in the storage unit 203 (S801).

The smartphone 701 starts the automatic wireless-parameter-setting selecting process by using the selecting unit 305 on the basis of the information obtained from the QR code. First, the smartphone 701 reads decoded data of the QR code, and checks whether or not apparatus-type information is stored in the decoded data (S802).

If the result of the determination in S802 indicates that apparatus-type information is not stored in the decoded data (NO in S802), the smartphone 701 displays an error on the display unit 207 and ends the process (S803). If apparatus-identification information is not included in the QR code, the smartphone 701 causes the process to end in failure in S803. The apparatus-identification information may be a MAC address or a UUID for identifying an apparatus uniquely. If information necessary to perform an automatic wireless-parameter setting process is not included in the QR code, the smartphone 701 causes the process to end in failure in S803.

If the result of the determination in S802 indicates that apparatus-type information is stored in the decoded data (YES in S802), the smartphone 701 checks whether or not the apparatus-type information indicates the access point (S804). If the apparatus-type information indicates the access point (YES in S804), the smartphone 701 selects the first method as automatic wireless-parameter setting to be performed (S805), The smartphone 701 uses the automatic setting processor 306 to perform automatic wireless-parameter setting according to the first method, shares wireless parameters between the smartphone 701 and the apparatus identified with the identifier in the QR code, and ends the process (S806). The process in S806 is similar to that described in S406.

In S804, if the smartphone 701 determines that the apparatus-type information indicates an apparatus type other than the access point (NO in S804), the smartphone 701 checks whether or not direct-setting-instruction information is included in the decoded data (S807). If the smartphone 701 determines that direct-setting-instruction information is included (YES in S807), the smartphone 701 selects the first method as automatic wireless-parameter setting to be performed (S805).

If the smartphone 701 determines that direct-setting-instruction information is not included (NO in S807), the smartphone 701 selects the second method as automatic wireless-parameter setting to be performed (S808).

The smartphone 701 uses the automatic setting processor 306 to perform automatic wireless-parameter setting according to the second method, transmits the identifier included in the photographed QR code to an access point, and ends the process (S809). The process in S809 is similar to that described in S408. In S809, when the transmission to the access point fails, or when a connection between the smartphone 701 and the access point has not been established, the smartphone 701 may cause the process to end in failure.

After S805 or S808, before the process in S806 or S809 is performed, the smartphone 701 may transmit an inquiry about whether or not the automatic wireless-parameter setting process is to be performed, to the user by using the display unit 207. When the user instructs the smartphone 701 to perform the automatic wireless-parameter setting process through the operation unit 206, the smartphone 701 may perform S806 or S809.

A sequence chart for the communication system according to the second embodiment will be described by using FIG. 9. In the sequence chart in FIG. 9, a case in which information obtained when the smartphone 701 photographs a QR code includes direct-setting-instruction information will be described.

After the printer 702 receives a parameter-setting start instruction, the printer 702 displays a QR code on the display unit (F901). In the displayed QR code, the identifier of the printer 702, apparatus-type information indicating the printer, and direct-setting-instruction information are encoded.

After the smartphone 701 receives the parameter-setting start instruction, the smartphone 701 activates the photographing unit 205 to photograph the QR code displayed on the printer 702 (F902).

After photographing of the QR code, the smartphone 701 performs the process described in FIG. 8. Since direct-setting-instruction information is detected, the smartphone 701 selects the first method as automatic wireless-parameter setting to be performed (F903). The smartphone 701 performs the process according to the first method, and receives wireless parameters from the printer 702 (F905). The smartphone 701 uses the received wireless parameters to establish a connection with the wireless network 703 (F905). The smartphone 701 may transmit image data to the printer 702 through communication using the received wireless parameters, and the printer 702 may perform a print service in which the received image data is printed.

In the second embodiment, the printer 702 constructs a wireless LAN network. However, the smartphone 701 may construct a wireless LAN network. In this case, the smartphone 701 transmits wireless parameters of the wireless network 703 constructed by the smartphone 701 to a target apparatus in S806 in FIG. 8. In FIG. 9, the smartphone 701 transmits wireless parameters of the wireless network 703 constructed by the smartphone 701 to the printer 702 (F904). The printer 702 which receives the wireless parameters establishes a connection with the wireless network 703 by using the wireless parameters (F905).

Thus, according to the second embodiment, an apparatus refers to direct-setting-instruction information included in a QR code, thereby being capable of selecting an automatic wireless-parameter setting process to be performed. Thus, usability is improved.

Modified Embodiments

Operations according to the first and second embodiments described above may be combined with one another as appropriate.

In the above-described embodiments, the configuration in which the image of a QR code is used to transmit information for setting wireless parameters, between apparatuses is described. However, instead of photographing of a QR code, wireless communication, such as NFC or Bluetooth (trademark), may be used. Instead, wireless communication, such as IEEE 802.11ad or TransferJet (trademark), may be used.

In the embodiments, a QR code which is read is not limited to a QR code displayed on a display unit. For example, a QR code attached on the case of a communication apparatus in the form of a label, or a QR code attached on an instruction manual or a package such as corrugated cardboard used when the communication apparatus is sold may be used. Alternatively, instead of a QR code, a one-dimensional bar code or a two-dimensional code other than a QR code may be used. Instead of information such as a QR code which may be read by a machine, information which may be read by a user may be used.

In the embodiments, the case in which communication between apparatuses is performed through wireless LAN communication in conformity with IEEE 802.11 is described. However, this is not limiting. For example, a wireless communication medium, such as Wireless USB, MBOA, Bluetooth (trademark), ultra-wideband (UWB), ZigBee, or NFC, may be used to perform communication. MBOA stands for the Multi Band Orthogonal Frequency Division Multiplexing (OFDM) Alliance. Ultra-wideband (UWB) includes Wireless USB, Wireless 1394, and WINET.

In the embodiments, the case in which an access point in a wireless LAN supplies wireless parameters is described. However, this is not limiting. For example, a group owner of Wi-Fi Direct (trademark) may supply wireless parameters.

In the embodiments, the first method may be a method in which the smartphone 101 transmits wireless parameters to the access point 103 and in which the access point 103 sets the received wireless parameters.

In the embodiments, the second method may be a method in which the smartphone 101 transmits wireless parameters of the access point 103 to the printer 102.

According to the embodiments, when wireless parameters are to be shared after photographing of a QR code, any of multiple processes may be selected.

The present invention may be achieved by performing a process in which a program for achieving one or more functions according to the above-described embodiments is supplied to a system or apparatus over a network or via a storage medium and in which one or more processors in a computer in the system or apparatus read and execute the program. The present invention may be achieved by using a circuit (such as an ASIC) achieving one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-023716, filed Feb. 9, 2015, which is hereby incorporated by reference herein in its entirety.

The invention claimed is:

1. A communication apparatus comprising:
one or more processors; and
one or more memories including instructions that, when executed by the one or more processors, cause the communication apparatus to:
capture an image displayed on or associated with another communication apparatus;
determine whether the another communication apparatus is an access point or not in a case where the image is captured;
execute, in a case where the another communication apparatus is an access point, first processing for sharing between the communication apparatus and the another communication apparatus a wireless parameter of a wireless network formed by the another communication apparatus, wherein the first processing is executed based on information that is necessary for wireless parameter setting and is included in the captured image; and
execute, in a case where the another communication apparatus is not an access point, second processing of transmitting Identification information to another access point that enables sharing between the another access point and the another communication apparatus a wireless parameter of a wireless network formed by the another access point, wherein the identification information is included in the information obtained from the captured image.

2. The communication apparatus according to claim 1, wherein the communication apparatus determines whether the another communication apparatus is an access point or not based on information acquired by analyzing the captured image.

3. The communication apparatus according to claim 1, wherein the communication apparatus displays an error in a case where information acquired by analyzing the captured image does not contain apparatus identification information or a public key as the information that is necessary for the wireless parameter setting.

4. The communication apparatus according to claim 1, wherein the communication apparatus performs the first processing, the first processing being a process in which the wireless parameter is transmitted through communication with the another communication apparatus indicated by identification information, the identification information being information necessary to set the wireless parameter and being included in the information obtained from the captured image.

5. The communication apparatus according to claim 1, wherein the image is a bar code or a two-dimensional code.

6. The communication apparatus according to claim 1, wherein the wireless parameter includes at least one of a service set identifier, an encryption key, an encryption method, an authentication key, and an authentication method.

7. The communication apparatus according to claim 1, wherein the wireless parameter is information for performing communication in conformity with an IEEE 802.11 series standard.

8. The communication apparatus according to claim 1, wherein the access point is an access point in an infrastructure mode set forth in an IEEE802.11 standard or a Group Owner set forth in a Wi-Fi Direct standard.

9. A control method for a communication apparatus, the control method comprising:
capturing an image displayed on or associated with another communication apparatus;
determining whether the another communication apparatus is an access point or not in a case where the image is captured;
executing, in a case where the another communication apparatus is an access point, first processing for sharing between the communication apparatus and the another communication apparatus a wireless parameter of a wireless network formed by the another communication apparatus, wherein the first processing is executed based on information that is necessary for wireless parameter setting and is included in information acquired from the captured image; and
executing, in a case where the another communication apparatus is not an access point, second processing of transmitting identification information to another access point that enables sharing between the another access point and the another communication apparatus a wireless parameter of a wireless network formed by the another access point, wherein the identification information is included in the information obtained from the captured image.

10. A non-transitory storage medium storing a program for causing a computer to perform a process comprising:
capturing an image displayed on or associated with another communication apparatus;
determining whether the another communication apparatus is an access point or not in a case where the image is captured;
executing, in a case where the another communication apparatus is an access point, first processing for sharing between the communication apparatus and the another communication apparatus a wireless parameter of a wireless network formed by the another communication apparatus, wherein the first processing is executed based on information that is necessary for wireless parameter setting and is included in information acquired from the captured image; and executing, in a case where the another communication apparatus is not an access point, second processing of transmitting identification information to another access point that enables sharing between the another access point and the another communication apparatus a wireless parameter of a wireless network formed by the another access point, wherein the identification information is included in the information obtained from the captured image.

\* \* \* \* \*